United States Patent
McMahon et al.

[15] 3,701,277
[45] Oct. 31, 1972

[54] FLUID FLOW METER

[72] Inventors: Richard A. McMahon, Pittsburgh; Winston F. Z. Lee, Delmont; Elmer F. Painley, Uniontown, all of Pa.

[73] Assignee: Rockwell Manufacturing Company, Pittsburgh, Pa.

[22] Filed: May 27, 1969

[21] Appl. No.: 828,135

[52] U.S. Cl. .................................................. 73/229
[51] Int. Cl. .................................................. G01f 1/06
[58] Field of Search ............... 73/229–231, 253–261; 235/94

[56] References Cited

UNITED STATES PATENTS

| | | | |
|---|---|---|---|
| 174,336 | 2/1876 | Witt | 73/229 X |
| 400,331 | 3/1889 | Graeser | 73/230 |
| 1,963,330 | 6/1934 | Lumme | 73/229 |
| 2,770,131 | 11/1956 | Sparling | 73/231 |
| 2,857,763 | 10/1958 | Hague | 73/257 |
| 2,915,606 | 12/1959 | Knauth | 73/229 X |
| 3,329,021 | 7/1967 | Quesinberry | 73/229 |

FOREIGN PATENTS OR APPLICATIONS

| | | | |
|---|---|---|---|
| 428,749 | 6/1948 | Italy | 73/229 |
| 925,562 | 9/1947 | France | 73/229 |
| 1,004,703 | 4/1952 | France | 73/229 |
| 1,289,529 | 11/1962 | France | 73/229 |
| 234,146 | 12/1944 | Switzerland | 73/229 |
| 377,125 | 6/1964 | Switzerland | 73/229 |
| 412,365 | 11/1966 | Switzerland | 73/229 |
| 417,136 | 1/1967 | Switzerland | 73/229 |

*Primary Examiner*—Richard C. Queisser
*Assistant Examiner*—C. E. Snee, III
*Attorney*—Strauch, Nolan, Neale, Nies & Kurz

[57] ABSTRACT

A fluid flow meter having a recessed body defining a fluid measuring chamber which is open at one end and which rotatably receives a fluid driven metering rotor. A register casing containing a fluid flow register mechanism is detachably fixed to the meter body and has a bottom wall part covering the open end of the chamber. Drive magnets and follower elements respectively disposed within the chamber and the casing on opposite sides of the casing bottom wall part transmit rotation of the rotor to actuate the register mechanism. The bottom wall part is interiorly concavely contoured so that its peripheral end portion extends essentially axially and terminates in an axially directed annular edge surface on which a structure, which mounts the register mechanism, is supportingly seated. The bottom wall part is further integrally formed with a flange extending radially from its axially extending end portion so that the wall part may be secured in place by clamping the flange between the meter body and a separately formed cover part of the casing. Concentric embossments formed integral with the bottom wall part define concentric wells opening in axially opposite directions respectively into the chamber and into the interior of the casing and respectively receiving the drive magnets and driven elements. The rotor is molded as one piece with an internal protrusion that forms a thrust bearing surface for a rotor support shaft extending into the rotor hub. A meter calibrating member selectively and transversely displaceably into an accurately diametered orifice at the inlet port for the measuring chamber provides an adjustment for meter registration.

15 Claims, 9 Drawing Figures

PATENTED OCT 31 1972

INVENTORS
RICHARD A. MC MAHON
WINSTON F. Z. LEE
ELMER F. PAINLEY

BY Strauch, Nolan, Neale,
Nies & Kurz
ATTORNEYS

PATENTED OCT 31 1972

INVENTORS
RICHARD A. MCMAHON
WINSTON F. Z. LEE
ELMER F. PAINLEY

BY Strauch, Nolan, Neale,
Nies & Kurz
ATTORNEYS

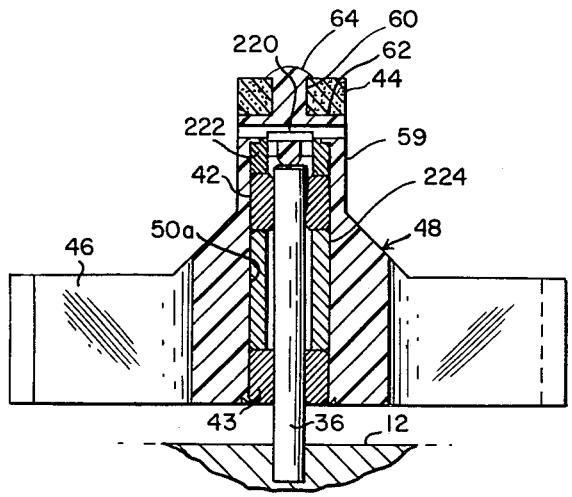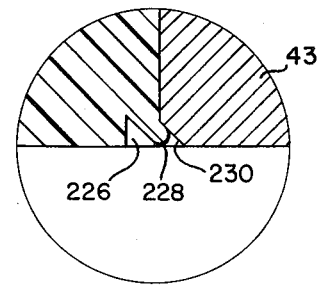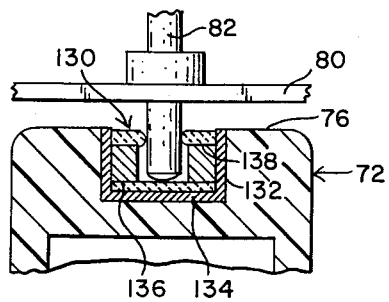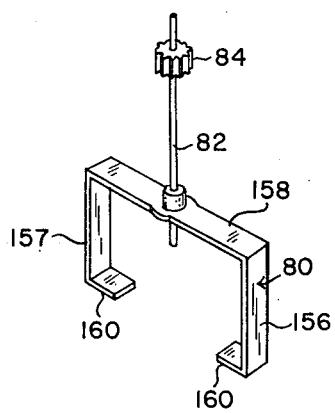

FLUID FLOW METER

FIELD OF INVENTION

This invention relates to fluid flow meters and is particularly concerned with the type of flow meter wherein the rotational axis of a fluid driven metering rotor is substantially normal to the direction of fluid flow through the meter body.

SUMMARY AND OBJECTS OF INVENTION

The invention herein contemplates a novel fluid flow meter which is efficiently organized, mechanically simplified, easily assembled, and uniquely constructed to provide a relatively low cost product without objectionably impairing the accuracy of the meter and without shortening the expected meter life.

The foregoing, which is a major object of this invention, is accomplished in part by a novel bottom wall part of a fluid flow register casing which is detachably fixed to the meter body. The meter body is simply formed with an outwardly opening recess to inexpensively define the metering rotor chamber, and the bottom wall part covers the open end of the chamber when the casing is assembled on the meter body.

The bottom wall part is inexpensively molded as one piece from non-magnetic material and is internally dished so that its outer peripheral end portion extends essentially axially with respect to the rotor rotational axis and terminates in an axially directed annular edge surface. A structure mounting the register mechanism within the casing is seated on the annular edge surface to thus provide a simplified support for the structure on the bottom wall part.

The register casing consists of the bottom wall part and a separately formed inverted cup-shaped cover which receives the assembly of the register mechanism and its support structure and which fits down over the axially extending end portion of the bottom wall part. The cover is advantageously molded as one piece from transparent material so that the register mechanism may be viewed from the exterior of the casing.

The skirt of the cover terminates in an annular flange that seats on another annular flange which is integral with the bottom wall part and which extends radially from the axially extending peripheral end portion of the bottom wall part. Both flanges are clamped between the meter body and a shoulder formed internally on a nut which is removably threaded onto the meter body. This novel and simplified construction thus enables the cover and bottom wall casing parts to be secured to the meter body simply by threading the nut onto the meter body.

In addition to the foregoing the bottom wall part affords a novel well arrangement for receiving coacting drive magnets and driven elements which transmit rotation of the rotor to actuate the register mechanism. Also, the bottom wall part is formed to cooperate with an internal-chamber forming surface of the meter body to ensure that a driven shaft support bearing properly aligns with the rotor rotational axis when the casing is assembled on the meter body.

The rotor is of novel, simplified construction to provide an internal thrust bearing surface for a rotor support shaft and also to provide a means for fixing the drive magnet on the rotor hub. In addition a uniquely simplified adjustment is provided for calibrating the meter.

Further objects and novel features of this invention will appear as the description proceeds in connection with the appended claims and the below described, annexed drawings.

DESCRIPTION OF THE DRAWINGS

FIG. 7 is an enlarged fragmentary section of a modified rotor assembly construction, with FIG. 7A being an enlargement of a portion of the rotor shown in FIG. 7;

FIG. 8 is an enlarged fragmentary section of the lower follower magnet shaft bearing assembly shown in FIG. 2; and FIG. 9 is a perspective view of the follower element shown in FIG. 2.

DETAILED DESCRIPTION

Figure 1:
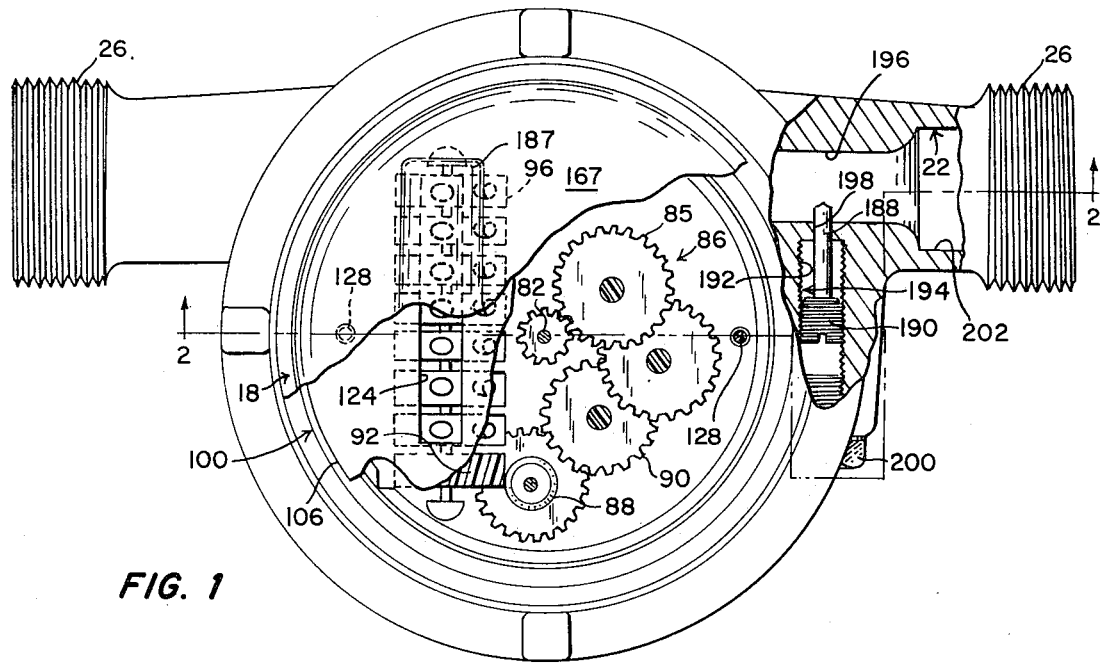
FIG. 1 is a partially sectioned top plan view of a meter assembly constructed according to a preferred embodiment of this invention.
Figure 2:
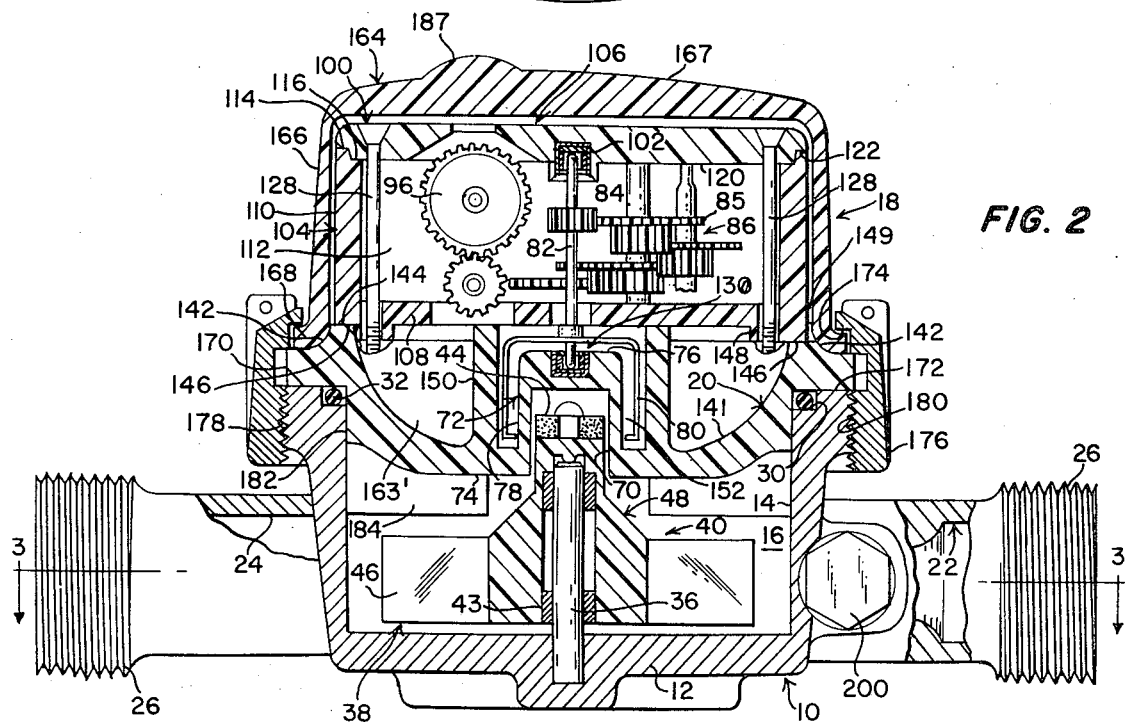
FIG. 2 is a longitudinal section taken substantially along lines 2—2 of FIG. 1.
Figure 3:
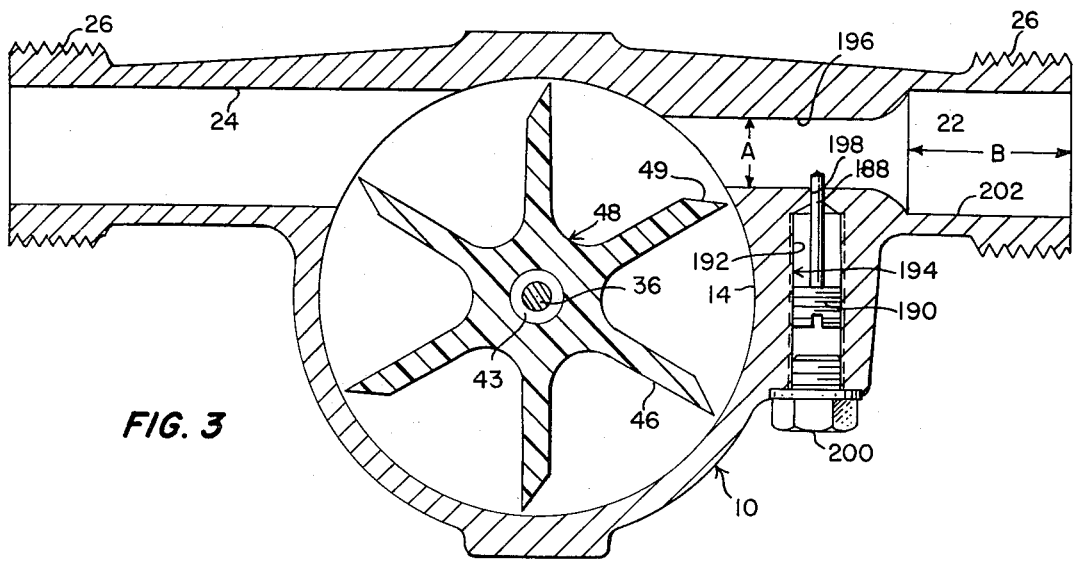
FIG. 3 is a section taken substantially along lines 3—3 of FIG. 2.

Referring to the drawings and first to FIGS. 1-3 the illustrated meter comprises a body 10 which is advantageously cast as one piece from any suitable metal or other material. Body 10 is essentially cup-shaped or recessed with an integral bottom wall 12 and a smooth, uniformly diametered, cylindrical, internal side wall surface 14 extending upwardly from wall 12. Wall 12 and surface 14 delimit a meter rotor chamber 16 which is open at its upper end. A register casing 18 has a bottom wall part 20 seated over the open end of chamber 16 to serve as a closure therefor.

As shown in FIGS. 2 and 3, body 10 is formed with an inlet passage 22 and an axially aligned outlet passage 24. The portions of body 12 defining passages 22 and 24 are threaded at 26 to provide for suitable connections to unshown fluid transmitting pipes.

As best shown in FIG. 3, passages 22 and 24 intersect chamber 16 generally tangentially just within its outer periphery. The longitudinal axis of chamber 16 is perpendicular and laterally offset from the aligned axes of passages 22 and 24. Passages 22 and 24 intersect chamber 16 adjacent to bottom wall 12 as best shown in FIG. 2. The internal chamber defining surface of wall 12 is substantially flat and lies in a plane perpendicularly intersecting the longitudinal axis of chamber 16.

At the upper edge of wall surface 14, body 10 is formed with an undercut shoulder 30 to seat a resilient O-ring 32 which provides a fluid tight seal between wall part 20 and body 10 and to thus prevent fluid leakage from chamber 16.

Figure 4:
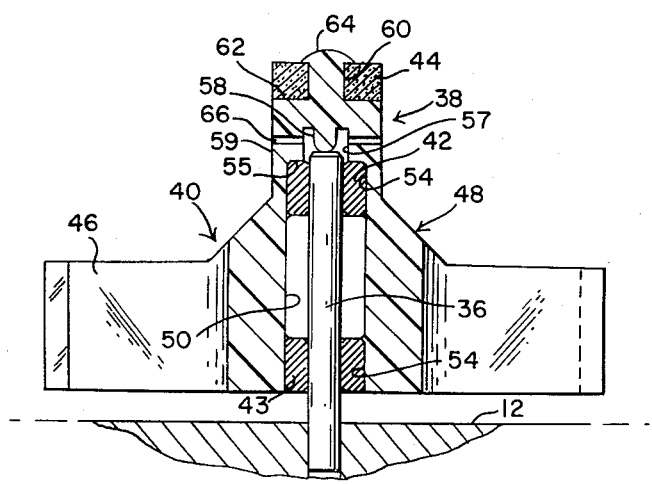
FIG. 4 is an enlarged, fragmentary longitudinal section of the rotor and support post assembly shown in FIG. 2.

As shown in FIGS. 2 and 4, a rigid, cylindrical post 36 is fixed at its lower end in wall 12 and extends upwardly in chamber 16 in coaxial relation to wall surface 14. A metering rotor assembly 38 is rotatably mounted on post 36 so that it will rotate about an axis that is substantially normal to the direction of flow of fluid through chamber 16. Rotor assembly 38 consists of a bladed rotor 40, a pair of graphite journal bearings 42 and 43 and an annular, permanent drive magnet 44.

Rotor 40, as best shown in FIG. 4, is formed with a plurality of equiangularly spaced apart blades 46 extending radially from a hollow hub 48. Blades 46 are each flat sided except for a flat bevel 49 on the leading blade side which provides a thin edge on the outer blade end. By forming bevel 49 on the leading blade side as shown, the greatest blade area is presented to fluid flow through chamber 16 without imparting a fluid pressure-produced radial thrust to rotor 40.

Hub 48 is formed with a cylindrical, stepped, blind bore 50 which coaxially receives post 36. Bearing 43 may be press fitted into the outer end of a diametrically enlarged section 54 of bore 50 which extends from the open bore end to an internal, radial shoulder 55. Bearing 42, which is axially spaced from bearing 43, is received in the inner end of bore section 54, and is seated against shoulder 55.

Preferably, rotor 40 is molded as one-piece around bearing 42 to confine bearing 42 in place within bore 50. Any suitable material may be employed for molding rotor 40, but advantageously polypropylene or other material of similar specific gravity is used when the meter is to be employed for metering water or other liquid of similar specific gravity. The similarity of the specific gravities of polypropylene and water is such that rotor assembly 38 will tend to float in the liquid in chamber 16, and since it is axially slidable on post 36, assembly 38 tends to ride up along post 36 to thus reduce the friction attributable to axial thrust forces and resisting fluid driven rotation of the rotor. As a result, the accuracy of the meter is improved.

Still referring to FIG. 4, the section of bore 50 extending axially between the internal end wall thereof and shoulder 55 is indicated at 57 and is of reduced diameter to receive the inner, free unsupported end of post 36 with a small clearance. At the inner end of bore 50, rotor 40 advantageously may be molded with a smoothly contoured protruberance 58 which extends from the bore end wall axially into bore section 57 in spaced relation to the cylindrical side wall surface of section 57. Protruberance 58 defines a thrust bearing surface adapted to seat against the inner, unsupported end of post 36 within bore 50. Protruberance 58 maintains rotor 40 spaced slightly above and thus out of contact with bottom wall 12.

From the foregoing rotor construction, it will be appreciated that rotor assembly 38 engages post 36 only at three confined regions of relatively small area, namely at the inner peripheries of bearings 42 and 43 and at the rounded end of proturberance 58. As a result, frictional forces applied to resist rotor rotation are minimized, and meter accuracy is correspondingly improved.

With continued reference to FIG. 4, hub 48 has a cylindrical extension 59 extending axially beyond blades 46 and terminating beyond the inner end of bore 50 in a reduced diametered, solid, cylindrical post 60 which is coaxial with the rotor axis. Post 60 interfittingly extends coaxially through and axially beyond magnet 44, and magnet 44 is seated on a radial annular shoulder 62 that is formed a the juncture between post 60 and hub extension 59.

In forming rotor 40, post 60 is molded through the central aperture of magnet 44 which is suitably held in place during the rotor molding operation so that it effectively forms a part of the mold for the rotor. The end of post 60 extending axially beyond magnet 44 is formed, during molding, with knob-like protruberance 64 which extends over the adjacent face of the magnet. Thus, by this simple and effective means magnet 44 is confined axially between molded rotors portion, namely shoulder 62 and protruberance 64. The hole through magnet 44 is non-circular and in cross section may be generally square with rounded corners. When post 60 is molded through this hole it will assume a like configuration in cross section so as to prevent relative rotation between magnet 44 and rotor 40 and to thereby provide a positive drive connecting between the two parts.

As shown in FIG. 4, hub 48 is formed with radial through bores 66 which intersect bore 50 adjacent to its inner end. Bores 66 provide passages for relieving the pressure of liquid or other fluid that may become trapped between the inner end of post 36 and the inner end of bore 50.

From the foregoing it will be appreciated that the construction of rotor assembly 38 is simplified to reduce manufacturing costs without impairing meter accuracy.

Post 36 is advantageously formed from a suitable stainless steel to minimize corrosion. However, it heretofore has been observed that engagement of such stainless steel bearing support members as post 36 or other shaft members with bearings made form graphite resulted in pitting, galling, and generally premature and objectionable wear of the bearing support member owing mainly to the fact that graphite is a harder material as compared with stainless steel. To eliminate this objectionable condition and yet facilitates the employment of graphite bearings, it heretofore has been common practice to plate such stainless steel bearing support members with a metal that is harder than graphite.

While plating part 36 would overcome the adverse effect which graphite has upon stainless steel it increases the manufacture cost of the final article. In seeking an alternate, less expensive solution to the problem engendered by using graphite bearings with a stainless steel post, it was unexpectedly found by the inventors herein that pitting, galling, and other forms of wear post 36 is minimized and for practical purposes is essentially eliminated without plating by providing post 36 with a smooth highly polished surface finish at least in the peripheral regions which are contacted by bearings 42 and 43. Preferably post 36 is polished to eight micro-inches or smoother, and 316 stainless steel is employed.

As shown in FIG. 2, the upper end of hub extension 59 and magnet 44 are coaxially and freely received in a cylindrically walled, uniformly diametered flat bottomed well or recess 70 which opens into chamber 16 along an axis axially aligning with the rotational axis of rotor 40. Well 70, as best shown in FIGS. 2 and 5, is defined by a cylindrical embossment 72 which is integrally formed with bottom wall part 20.

Figure 6:
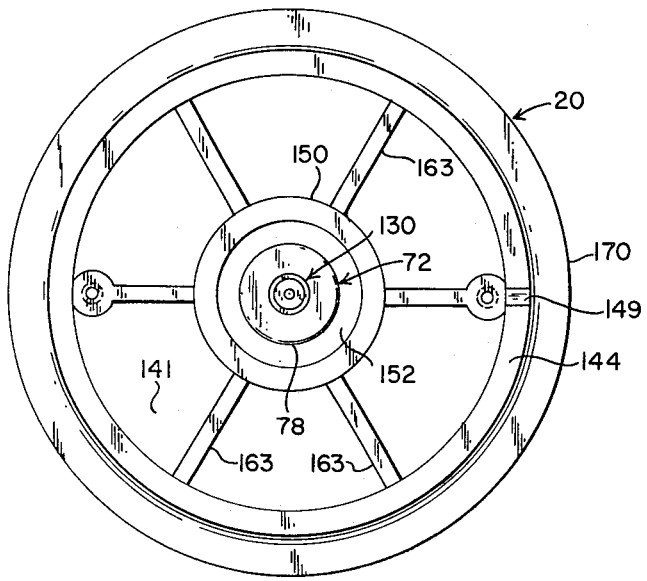
FIG. 6 is a top plan view of the register casing bottom wall part.
Figure 5:
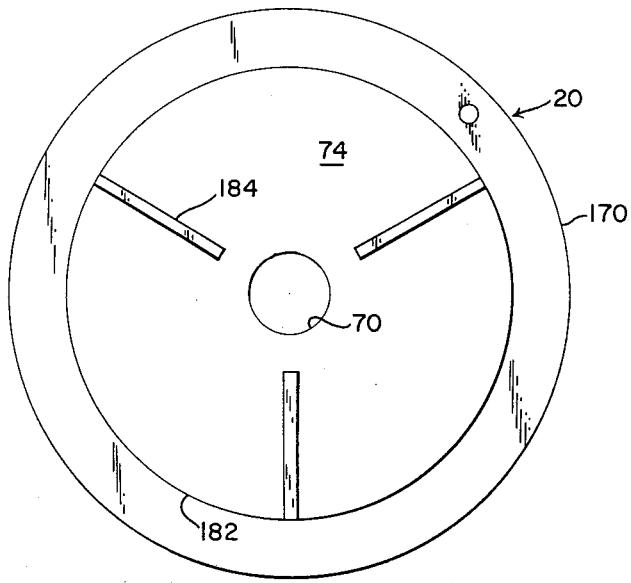
FIG. 5 is a bottom plan view of the register casing bottom wall part.

With reference to FIGS. 2, 5, and 6, embossment 72 is centrally formed in part 20 in coaxial relation with the longitudinal axis of a circular body portion 74 of part 20. Embossment 72 is formed inwardly of body portion 74 so that, instead of protruding into chamber 16, it protrudes into the interior of register casing 18. As shown, embossment 72 is defined by an end wall 76 and a smooth, cylindrical side wall 78 which is integrally joined at opposite ends to end wall 76 and body portion 74.

Magnet 44, as shown in FIG. 2, is magnetically coupled through side wall 78 to a non-permanently magnetizable follower or driven element 80 which is non-rotatably fixed on a shaft 82 for rotation in a path peripherally surrounding side wall 78 and magnet 44 within casing 18. The axis about which follower 80 is rotatable substantially axially aligns with he rotational axis of rotor 40.

Still referring to FIG. 2, a gear 84 non-rotatably mounted on shaft 82 constantly meshes with an input gear 85 of a counter drive gear train 86. Train 86, as shown in FIG. 1, has an output gear 88 which is connected by gearing (indicated at 90) to gear 84 and which constantly meshes with a gear 92. Gear 92 is fixed to an input counter wheel of a suitable conventional counter 96 which comprises a register mechanism for indicating the volume of fluid that has flowed through the meter.

From the construction thus far described it will be appreciated that in operation of the meter, fluid to be metered flows through chamber 16 to rotate rotor 40. Follower 80, being coupled to magnet 44, transmits rotation of rotor 40 through gear train 86 to actuate counter 96, thus providing a registration of the volume of fluid that has passed through chamber 16. It will be noted that the number registered by counter 96 will be proportional to the number of turns made by rotor 40, and the number of turns made by rotor 40 will be closely proportional to the volume of fluid that has flowed through the meter.

As shown in FIG. 2, a two-part housing structure 100 supported within casing 18 mounts counter 96, gear train 86 and the upper bearing assembly 102 for shaft 82. Structure 100 consists of a cup-shaped housing part 104 and cover plate 106.

Housing part 104 is formed with a bottom wall 108 and a uniformly diametered, cylindrical side wall 110 extending upwardly from wall 108 and cooperating therewith to define an upwardly opening compartment 112 for receiving counter 96 and gear train 86.

The upper end of wall 110 is formed with a smooth, flat annular face 114 around the upper edge of compartment 112 as well as an undercut shoulder 116 that is peripherally surrounded by face 114. Cover plate 106 is formed on its inner side with a cylindrical extension 120 which is received with a piloting fit in the recess defined by the undercut shoulder 116. An annular face 122 formed on the underside of cover plate 106 in peripherally surrounding relation to extension 120 seats on face 114 so that plate 106 serves as a closure for the open end of compartment 112.

Counter 96 and gear train 86 are suitably mounted in housing part 104, and cover plate 106 is formed with a rectangular aperture 124 to expose the indicia on the wheels of counter 96. Housing part 104 and cover plate 106 advantageously may be molded from a suitable plastic material and are detachably secured together by a pair or screws 128 each extending through aligned holes in plate 106 and bottom wall 108 and threaded into an aligned, tapped blind bore which is formed in the register casing bottom wall part 20. Housing structure 100 is thus detachably fixed to bottom wall part 20 and is supported thereon in a manner to be described in detail later on.

Shaft 82, as shown in FIG. 2, has a lower bearing assembly 130 mounted in end wall 76 of embossment 72. Its upper bearing assembly 102 is mounted in cover plate 106, and shaft 82 extends freely through an enlarged aperture in the bottom all of housing part 104 as shown.

Bearing assembly 130, as shown in FIG. 8, comprises a metal, cup-shaped holder 132 which is interfittingly seated in a recess formed in end wall 76 and which receives a thrust bearing plate 134, an annular spacer 136 overlying bearing plate 134, and an annular radial bearing 138 overlying spacer 136. Plate 134, spacer 136, and bearing 138 may be press fitted coaxially into holder 132. Plate 134 and bearing 138 preferably are each made from a suitable artificial jewel bearing material.

As shown, the lower end of shaft 82 rotatably extends through bearing 138, freely through spacer 136, and is adapted to seat on plate 134. The inner peripheral edges of bearing 138 are smoothly rounded as shown in FIG. 8 to allow effective pivotal movement of shaft 82 about the center point of bearing 138. This pivotal movement of shaft 82 is permitted by virtue of bearing 138 being axially spaced from plate 134.

Bearing assembly 102 is identical to bearing assembly 130. The rounded inner peripheral edges of bearings 138 in assemblies 102 and 130 enable shaft 82 to pivotally shift without binding into alignment with assemblies 102 and 130 under conditions where assemblies 102 and 130 are slightly axially misaligned upon assembly of housing structure 100 on bottom wall part 20.

Referring back to FIG. 2, the interior body surface of bottom wall part 20 is dished or concavely contoured at 141 so that the peripheral end portion (indicted at 142) of part 20 extends axially and upwardly in coaxial, surrounding relation with respect to the rotational axis of rotor 40 and shaft 82. End portion 142 terminates in a flat annular end face 144 which matingly seats against a flat, downwardly facing annular surface 146. Surface 146 is formed on the underside of bottom wall 108 and peripherally surrounds an annular boss 148 depending from wall 108 and coaxially received with a piloting fit within end portion 142. Except for coacting key and slot location portions respectively on arts 104 and 20 an indicated at 149 in FIG. 2, the interface between surface 146 and end face 144 lies in one plane that perpendicularly intersects the axes of shaft 82 and rotor 40. Thus, housing part 104 seats on annular face 144 so that the housing structure 100 together with all the previously described register mechanism, gear train, and bearing parts mounted thereon is supported on bottom wall part 20.

The pilot fit provided by boss 148 in end portion 142 and the pilot fit provided by extension 120 in housing part 104 ensures close alignment between bearing assemblies 102 and 130.

As shown in FIGS. 2 and 6, bottom wall part 20 is further formed with a central annular embossment 150 concentrically surrounding embossment 72 and extending from the interior side of body portion 74 into casing 18. Embossment 150 is radially spaced from embossment 72 to define there with an annular well or recess 152 which opens upwardly into the interior of casing 18 along an axis aligning with the axes of rotor 40 and shaft 82. Thus wells 70 and 152 open axially in opposite directions and respectively open into chamber 16 and the interior of casing 18.

Follower 80, as best shown in FIG. 9, is of U-shaped configuration having a pair of parallel, spaced legs 156 and 157 which are integrally joined together by a cross piece 158. Cross piece 158 is centrally apertured to receive shaft 82 and is fixed on shaft 82 by suitable means.

Legs 156 and 157 extend axially into well 152 so that their lower ends rotate in a path concentrically surrounding wall 78 and magnet 44.

As shown in FIG. 9, the lower ends of legs 156 and 157 are turned radially inwardly at 160 toward the side wall of embossment 72 and extend perpendicularly with respect to the axially extending leg portions. As a result, the ends of the in-turned ends of legs 156 and 157 face radially inwardly. It was found that this construction, as compared with a follower construction not having the radially in-turned ends 160, reduces the axial thrust that is produced by the magnetic coupling effect between magnet 44 and follower 80 and tending to pull shaft 82 downwardly. As a result, the bearing friction attributable to this axial thrust and resisting rotation of shaft 82 is reduced to thereby improve the accuracy of meter registration. In effect, in-turned ends 160 confine and direct the magnetic flux lines radially with respect to magnet 44.

As best shown in FIG. 6, bottom wall part 20 is further formed with a plurality of equiangularly spaced apart, flat-sided stiffening ribs 163 extending radially between and joined at opposite ends to embossment 150 and end portion 142. The bottom edges of ribs 163 are integrally joined to body portion 74. End portion 142, as best shown in FIG. 2, peripherally and concentrically surrounds embossment 150 in radially spaced relation thereto. Embossment 150 may seat against the bottom wall of housing part 104 to provide further support for housing structure 100. Embossment 150, by virtue of being joined to the inner ends of ribs 163, greatly stiffens ribs 163, as well as body portion 74 to provide part 20 with the desired rigidity without necessitating the extension of ribs 163 through the space occupied by magnet 80. Thus, the unique stiffening interlock between ribs 163 and embossment 150 affords the unblocked annular space for receiving magnet 80. As a result of providing this location for magnet 80, magnet 80 may be radially positioned relative to magnet 44 and constructed in the manner previously described to ensure a strong magnetic coupling for transmitting rotor rotation to actuate the register mechanism.

As shown in FIG. 2, casing consists of two separately formed parts, namely bottom wall part 20 and a one-piece inverted, cup-shaped cover 164 having an annular skirt portion 166 depending from a circular top wall portion 167. Cover 164 cooperates with bottom wall part 20 to provide the register casing enclosure receiving housing structure 100 and follower 80. The lower end of skirt portion 166 terminates in an annular flange 168 which extends outwardly from skirt portion 166 and radially with respect to the axes of shaft 82 and rotor 38.

When the parts of casing 18 are assembled, flange 168 interfittingly and separably seats on another annular flange 170 which is formed integral with bottom wall part 20 and which extends radially outwardly from end portion 142 in peripherally surrounding relation thereto. Flanges 168 and 170 are clamped axially between a flat, annular meter body face 172 and an annular shoulder 174 formed in a nut 176. Face 172 is formed on a boss portion 178 of meter body 10 and peripherally surrounds shoulder 30 at the upper edge of chamber 16. Nut 176 is detachably threaded on boss portion 178 at 180, and the underside of flange 170 seats on face 172 so that O-ring 32 will be compressed between flange 170 and shoulder 30.

A final step in the assembly procedure of the register casing 18 is the sealing of the juncture of flanges 168 and 170, to hermetically seal the register from any detrimental environment and also to prevent unauthorized tampering with the register. By sealing flanges 168 and 170, they become integrally joined together with the result that casing 18 is transformed into a unitary structure. Access into the interior of casing 18 can therefore by made only by unconcealable destruction of one or more of the integrally joined casing parts. Flanges may be integrally joined together prior to assembly of casing 18 of the meter body by cementing, ultra sonic welding or any other suitable means.

From the foregoing it will be appreciated that cover 164 is securely fixed to bottom wall part 20 and that the assembly of cover 164 and bottom wall part 20 are securely fixed to meter body 10 simply by sliding nut 176 over cover 164 and by threading it onto boss portion 178.

Still referring to FIG. 2, bottom wall part 20 is further integrally formed with a cylindrical, uniformly diametered extension 182 which depends from body portion 74 and which is coaxially, interfittingly received with a piloting fit in the upper end of chamber 16. O-ring 32, which provides a fluid tight seal between bottom wall part 20 and body 10, peripherally surrounds extension 182 as shown. Extension 182 cooperates with side wall surface 14 to properly position bottom wall part 20 on body 10 and to locate bearing assembly 130 in substantial axial alignment with the rotational axis of rotor 40.

As shown in FIGS. 2 and 5, bottom wall part 20 is further integrally formed with a plurality of equiangularly spaced apart relatively thin, flat-sided vanes 184 extending radially with respect to well 70 and depending from the bottom end face of extension 182 within the region of chamber 16 just above rotor blades 46. Vanes 184 are of equal height and equal width and generate turbulence to increase the range of accuracy of the meter.

Cover 164 is preferably molded as one piece from a suitable transparent plastic and has a magnifying portion 187 registering with aperture 124 so that the registered indicia on the wheels of counter 96 may conveniently be read. Bottom wall part 20, also is molded as one-piece from a suitable plastic, non-magnetic material.

As shown in FIG. 1, a meter calibrating needle member 188 having a cylindrical shank and pointed end is formed rigid with a diametrically enlarged threaded section 190 which is threadedly received in a tapped section 192 of a stepped bore 194. Bore 194 is formed in a body 10 along an axis normally intersecting an accurately diametered orifice 196 which forms a part of inlet passage 22.

The inner end of bore 194 which transversely opens into orifice 196 if formed by a reduced diametered bore section 198 through which member 188 coaxially and slidably extends with a guiding fit. The outer end of bore 194 is closed by a plug 200 which is removable to provide access to section 190 with a suitable tool for turning and thus axially advancing member 188 to a position where it transversely extends by a selected length into orifice 196.

Member 188 acts as a restrictor for fluid flowing through orifice 196, and by selectively varying the extent to which it protrudes into orifice 196, the percentage of meter registration will be varied correspondingly to thus provide a convenient and structurally simplified calibration of the meter to correct registration inaccuracies.

As shown the inlet end of orifice 196 smoothly merges with a diametrically enlarged inlet port section 202 which forms the outer portion of passage 22. The outlet end of orifice 196 opens into chamber 16.

The following dimensions in terms of inches constitute one example that affords accurate meter calibration with needle member 188 in a one-half inch water meter:

| | |
|---|---|
| Diameter of orifice 196 (Indicated at A in FIG. 3) | 0.3591 ± .0005 / .0000 |
| Axial Length of section 202 (Indicated at B in FIG. 3) | 0.655 ± .001 |
| Diameter of member 188 | .090 ± 000 |

In the foregoing example the distance measured along the axis of orifice 196 between the axis of member 188 and the inner end of port secton 202 is 0.262 inches. The transition between port section 202 and orifice 196 is smoothly contoured to minimize turbulence.

With the foregoing dimensions the criticality of the maintaining of the diameter of orifice 196 within the noted tolerance values is emphasized by the fact that a deviation of 0.001 will result in about 0.5 percent change in registration for a one-half inch water meter.

The modified rotor construction shown in FIG. 7 is the same as that illustrated in FIG. 2 except that the integral thrust bearing protrusion 58 has been replaced with a separately formed thrust bearing 220, that annular bearing spacers 222 and 224 have been added, and that the bottom face of rotor 40 has been annularly notched at 226 (see FIG. 7A) to provide an annular lip 228 around the lower edge of a bore 50a. Bearing 220 is seated in the inner end of bore 50a which is the same as bore 50 except that it is not stepped as previously described. Spacer 222 is at the inner end of bore 50a, and bearing 42 is axially confined between spacers 222 and 224 so as to be axially spaced from bearing 43. The entire sub-assembly of bearings 42, 43, and 220 and of spacers 222 and 224 is axially confined in bore 50a by deforming lip 228 radially inwardly to seat against an annular, beveled, outer peripheral edge 230 of bearing 43.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefor intended to be embraced therein.

What is claimed and desired to be secured by Letters Patent is:

1. In a fluid flow meter, a body recessed to define a rotor chamber that is open at one end, said body having fluid inlet and outlet ports providing for the flow of fluid to be measured through said chamber, a metering rotor mounted in said chamber for rotation about an axis extending substantially normal to the direction of flow of fluid through said chamber, said rotor being driven by the flow of fluid through said chamber, a register mechanism, a register casing receiving said register mechanism, means detachably fixing said casing to said body, means drive connecting said rotor to said register mechanism to impart rotation of the former to actuate the latter, said casing having a bottom wall part covering said open end and delimiting both said chamber and the interior of said casing, said bottom wall part having a terminal portion disposed interiorly of said casing and terminating in an annular surface, said terminal portion extending axially of the rotational axis of said rotor in peripheral surrounding relation to said axis, said casing also including a further part formed separately of said bottom wall part and coaxially receiving said terminal portion, said further part delimiting the interior of said casing, and a structure received within said casing and mounting said mechanism, said structure being seated on said annular surface to be supported thereby, and said bottom wall part being formed with an annular flange portion extending radially from said terminal portion and being clamped between a portion of said further part and said body by said means detachably fixing said casing to said body.

2. The fluid flow meter defined in claim 1 wherein said further part is of inverted cup-shaped configuration receiving the assembly of said structure and said mechanism and defining the side and top wall surfaces of said casing for enclosing said mechanism in cooperation with said bottom wall part.

3. The fluid flow meter defined in claim 2 wherein said further part is formed as one piece from transparent material to enable said mechanism to be viewed from the exterior of the casing.

4. The fluid flow meter defined in claim 1 wherein said means drive connecting said rotor to said register mechanism comprises drive magnet means mounted on said rotor for rotation therewith within said chamber and driven means rotatably mounted within said casing and being magnetically coupled through said bottom wall part to said drive magnet means to transmit rotation of the rotor for actuating said mechanism.

5. The fluid flow meter defined in claim 4 wherein said bottom wall part is formed with means defining two concentric recesses opening in axially opposite directions respectively into said chamber and the interior of said casing and respectively receiving said drive magnet means and said driven means.

6. The fluid flow meter defined in claim 5 wherein said recess defining means comprises a cylindrical embossment and an annular embossment both protruding into the interior of said casing, with said annular embossment peripherally surrounding said cylindrical embossment, the recess opening into said chamber being defined by said cylindrical embossment, and the recess opening into the interior of said casing being defined between said embossments and being of annular configuration, said bottom wall part being further formed with stiffening ribs which extend radially between and are joined to said edge surface means and said annular embossment.

7. In a fluid flow meter, a body recessed to define a rotor chamber that is open at one end, said body having fluid inlet and outlet passages to provide for the flow of fluid to be metered through said chamber, a fluid driven rotor mounted within said chamber for rotation about an axis extending substantially normal to the direction of flow of fluid through said chamber, a register mechanism, a register casing receiving said mechanism and having bottom wall part seated over said open end to provide a closure therefor, said bottom all part being formed separately of the remainder of said casing, means detachably fixing said casing on said body, coacting drive magnet and driven means respectively disposed on opposite sides of said bottom wall part and being respectively connected to said rotor and said mechanism for transmitting rotation of said rotor to actuate said register mechanism, said bottom wall part being integrally formed with a peripheral end portion extending substantially axially with respect to said axis in peripherally surrounding relation thereto and terminating in an axially directed annular end face, and means formed separately of said casing and being separably seated on said annular end face for supporting said mechanism, said bottom wall part vein further integrally formed with an annular flange portion extending radially from said end portion in peripherally surrounding relation thereto, said flange portion being disposed axially between opposing annular surfaces respectively formed on said body and a portion of a further part of said casing, said means detachably fixing said casing on said body engaging said body and said portion of said further part to clamp said annular flange portion between said annular surfaces.

8. In a fluid flow meter, a body having a rotor chamber and fluid inlet and outlet passages providing for flow of fluid to be measured through said chamber, a fluid driven metering rotor mounted within said chamber for rotation about an axis extending substantially normal to the direction of flow of fluid through said chamber, a register mechanism, a register casing mounted on said body for receiving said mechanism and having a bottom wall part, coacting drive magnet means and driven means disposed on opposite sides of said bottom wall part and being magnetically coupled through said part for imparting rotation of said rotor to actuate said mechanism, said casing having a further part formed separately of said bottom wall part and cooperating therewith to enclose said mechanism, said bottom wall and further part being respectively formed with annular flanges which are integrally and permanently joined together to hermetically seal said casing.

9. The fluid flow meter defined in claim 8 wherein said further part is of inverted cup-shaped configuration, and wherein said flanges are in axially aligned abutting relation and extend radially outwardly relative to the rotational axis of said rotor.

10. The fluid flow meter defined in claim 9 comprising means clamping the assembly of said flanges against a surface of said body for detachably securing said casing to said body.

11. The fluid flow meter defined in claim 8 wherein said register mechanism is completely enclosed only by said bottom wall part and said further part, said bottom wall and further parts, upon being integrally joined together at said annular flanges, providing a unitary casing structure that enables access to the interior thereof only by unconceable destruction of one or more of said parts.

12. The fluid flow meter defined in claim 11 wherein said further part has a top wall portion and a skirt portion depending from said top wall portion and terminating at its lower end in the annular flange of said further part, the annular flange of said further part being seated on the annular flange of said bottom wall part.

13. In a fluid flow meter, a body recessed to define a rotor chamber that is open at one end, said body having fluid inlet and outlet passages providing for the flow of fluid to be measured through said chamber, a bladed fluid metering rotor rotatably mounted in said chamber about an axis extending substantially normal to the direction of flow of fluid through said chamber to be driven by the fluid flow through said chamber, a register mechanism, a register casing mounted on said body and receiving said register mechanism, said register casing having a bottom wall part and a further part formed separately of said bottom wall part, said bottom wall part covering said open end and delimiting both said chamber and the casing space receiving said register mechanism, coacting drive magnet means and driven magnet means respectively disposed on opposite sides of said bottom wall part and being magnetically coupled through said bottom wall part for transmitting rotation of said rotor to actuate said register mechanism, said body having a register casing supporting surface peripherally surrounding said open end, said bottom wall part being formed with an annular flange extending radially of the rotational axis of said rotor and overlying said supporting surface to be supported thereon, said further part being formed with a top wall portion and a skirt portion depending from said top wall portion and having at its lower end an annular flange extending radially outwardly from said skirt portion and overlying the annular flange of said bottom wall part, with the annular flange of said bottom wall part being confined between said supporting surface and the annular flange of said further part, and means engaging said body and the annular flange of said further part for rigidly securing said bottom wall and further parts to said body.

14. The fluid flow meter defined in claim 13 wherein the annular flanges of said bottom wall and further parts seat against each other, and wherein said register mechanism is completely enclosed only by said bottom wall and further parts.

15. The fluid flow meter defined in claim 13 wherein the annular flange of said bottom wall part seats on said supporting surface, and wherein said means for securing said bottom wall and further parts to said body is a member threaded onto said body and having a flange-engaging surface, said flanges of said parts being clamped between said flange engaging surface and said supporting surface.

* * * * *

UNITED STATES PATENT OFFICE
CERTIFICATE OF CORRECTION

Patent No. 3,701,277                    Dated October 31, 1972

Inventor(s) McMahon et al

It is certified that error appears in the above-identified patent and that said Letters Patent are hereby corrected as shown below:

Column 4, line 6, after "with" insert --a--.

Column 4, line 36, change "facilitates" to --facilitate--.

Column 4, line 48, after "wear" insert --of--.

Column 5, line 13, change "he" to --the--.

Column 6, line 42, change "axis" to --axes--.

Column 6, line 50, change "location" to --locating--.

Column 6, line 50, change "arts" to --parts--.

Column 7, line 57, after "casing" insert --18--.

Column 8, line 25, change "by" to --be-- (first occurrence).

Column 8, line 28, after "18" change "on" to --of--.

Column 9, line 10, change "if" to --is--.

Column 9, line 38, change ".090$\pm$ 000" to --.090$\pm$ $^{000}_{002}$--.

Column 11, line 27 (claim 7) change "all" to --wall--.

Column 11, line 40 (claim 7) change "vein" to --being--.

Signed and sealed this 24th day of April 1973.

(SEAL)
Attest:

EDWARD M. FLETCHER, JR.                 ROBERT GOTTSCHALK
Attesting Officer                       Commissioner of Patents